3,804,753
PROCESS OF DEWATERING SEWAGE SLUDGE AND CONVERTING THE SAME TO A USEABLE PRODUCT
Robert E. Baier, Buffalo, N.Y., assignor to Calspan Corporation, Buffalo, N.Y.
No Drawing. Continuation of abandoned application Ser. No. 158,124, June 29, 1971. This application Dec. 7, 1972, Ser. No. 313,071
Int. Cl. B01d 11/04
U.S. Cl. 210—21     8 Claims

ABSTRACT OF THE DISCLOSURE

A process of dewatering sewage sludge or the like waste and converting the same to a useable product whereby the sludge is placed in a porous container and saturated with a water displacing ingredient such as technical grade butanol, after a period of time sufficient for dehydration to occur, the container pores are closed, and to the sludge is added a polymerizable material for a period of time at an elevated temperature sufficient to permit complete polymerization to occur.

---

This is a continuation of application Ser. No. 158,124, filed June 29, 1971 now abandoned.

BACKGROUND OF THE INVENTION

The present invention is related to the treatment of sewage sludge and, more particularly, the dewatering and conversion thereof to a useable product.

Municipal solid waste is dominated by hydrophilic biological entities, many having a fibrous nature. A black, malodorous, very wet mass called activated sludge is the intermediate byproduct of most current sewage treatment plants; it is this byproduct that is the most difficult and costly to dispose of. There thus exists a need for a simple, more economic scheme for dewatering and converting this activated sludge to a useable product.

Many techniques have been proposed for converting sewage sludge to a useable product, but in the main these have been costly, complicated and ineffective.

For example a number of techniques require flocculation of the sludge with a coagulant, scraping of the sludge onto large mesh screens for further dewatering and mechanical compression of the resulting product. Most of these techniques, as well as others, require the application of energy-consuming mechanical forces or processes.

SUMMARY OF THE INVENTION

The present invention provides a process of displacing the water from sewage sludge or hydrous waste of any origin by a surface chemical mechanism without the requirement of energy consuming mechanical forces. Additionally, the sludge product so dehydrated is in an extremely receptive state for infiltration with other organic materials including organic monomers and other solid-precursor type chemicals.

Basically the present invention contemplates placing the wet activated sludge into a container corresponding in shape to the desired shape of the end product, the container having suitable drain openings adjacent the bottom thereof, distributing over the top of the sludge a water displacing ingredient, such as technical grade butanol which percolates through the sludge over a period of time, closing the drain openings of the container, and pouring over the sludge, still wet with the water displacing ingredient, a suitable monomer and polymerization catalyst which infiltrates the pores of the sludge, maintaining the sludge at an elevated temperature for a period of time sufficient to permit complete polymerization to occur, after which the final product is removed from the container in the form of a dry, strong, sterile "brick" suitable for use in construction or the like.

For a fuller understanding of the present invention, reference should now be had to the following detailed description thereof.

DESCRIPTION

Activated sewage sludge and other waste products consist primarily of a fibrous mass of long chain polymeric molecules that are strongly hydrophilic tending to form thixotropic gels of very high water content. It is this waste that, heretofore, has been the most difficult to convert or remove without adding to environmental pollution. Although the foregoing description relates to sewage sludge, it is to be understood that any waste having the above characteristics can be treated..

According to the present invention the activated sludge is placed into a container, the shape of which is chosen to correspond to the shape of the final product. For example, a rectangular container would be chosen if a rectangular shaped "brick" is desired. The container is preferably porous or has drain openings at the bottom thereof so that liquids are permitted to escape. The sludge substantially fills the container. A suitable water displacing ingredient such as technical grade butanol is slowly distributed over the top of the wet sludge and percolated therethrough over a period of time sufficient to cause most of the displaced water of the sludge to drain through the porous bottom of drain openings of the container. The amount of water displacing ingredient and time involved will depend upon the volume of sludge. For example with a container of 9 by 6 by 5 centimeters enclosing a volume of 270 cubic centimeters and 90 cc. of butanol a time of about one hour was sufficient. In addition to its water displacing function this treatment also provides a first sterilization of the sludge.

With the dehydrated sludge still wet with the water displacing ingredient, the bottom of the container is suitably covered to prevent continued drainage of liquid. A suitable monomer and polymerization catalyst, such as tert-butylstyrene with benzoyl peroxide is poured over the sludge in the container and the mixture is heated at a temperature and a period of time sufficient for complete polymerization to occur. In addition to polymerization, this step functions as a second sterilization step for the sludge. The temperature and time and amount of organic liquid will depend upon the volume of sludge being treated. For example, at a temperature of 80° C., the above mentioned volume of sludge took about 4 hours for complete polymerization. The amount of organic liquid was 50 cc. of tert-butylstyrene with about 1% benzoyl peroxide.

The resulting product is tapped out of the container in the form of a dry, strong and sterile "brick" suitable for useful applications. In the above example the "brick" was approximately 8.8 by 5.2 by 2.7 centimeters.

Although the foregoing description related to a preferred embodiment of the present invention, obvious changes will occur to those skilled in the art. For example, instead of technical grade butanol as the water displacing ingredient any aliphatic monohydric alcohol having from 4 to 8 carbon atoms and a straight chain of at least 3 carbon atoms may be utilized. Additionally, instead of the tert-butylstyrene monomer any suitable polymerizable material can be utilized so long as it is fluid enough that it can enter the pores of the dehydrated waste mass. Also, instead of the benzoyl peroxide polymerization catalyst, other known techniques or ingredients which initiate polymerization can be employed. For example, radiation can be used to initiate polymerization. This would have an additional sterilization advantage.

It is therefore intended that the present invention is to be limited only by the scope of the appended claims.

What is claimed is:

1. A process of dewatering fibrous waste masses of long chain polymeric molecules such as activated sewage sludge and converting the same to a useable product comprising, the steps of:
    (1) placing said waste into a container corresponding in shape to the shape of the desired end product,
    (2) slowly distributing over the top of said waste a water displacing ingredient which percolates therethrough over a period of time sufficient to cause displaced water from said sludge to drain from said container,
    (3) pouring a polymerizable fluid over said waste including a polymerization catalyst, and
    (4) heating said waste for a period of time sufficient for complete polymerization thereof to occur.

2. The process according to claim 1, wherein said container has drain openings which are closed prior to the addition of said polymerizable fluid.

3. The process according to claim 2, wherein said water displacing ingredient comprises an aliphatic monohydric alcohol having from 4 to 8 carbon atoms and a straight chain of at least 3 carbon atoms.

4. The process according to claim 3, wherein said polymerizable fluid comprises a monomer.

5. The process according to claim 4, wherein said monomer comprises tert-butylstyrene.

6. The process according to claim 5, wherein said tert-butylstyrene includes a benzoyl peroxide polymerization catalyst.

7. The process according to claim 6, wherein said step of heating comprises heating said waste to a temperature of 80° C. for a period of 4 hours.

8. The process according to claim 1, wherein said step of heating comprises heating said waste to a temperature of 80° C. for a period of 4 hours.

References Cited
UNITED STATES PATENTS

| | | | |
|---|---|---|---|
| 3,226,318 | 12/1965 | Schick | 210—10 |
| 3,365,395 | 1/1968 | McDonald | 210—66 X |
| 3,527,698 | 9/1907 | Von Reppert et al. | 210—10 |
| 3,436,342 | 4/1969 | Fwiwara et al. | 210—66 X |

JOHN ADEE, Primary Examiner

R. H. SPITZEE, Assistant Examiner

U.S. Cl. X.R.

52—DIG. 9; 210—71